June 18, 1963 J. B. BEACH 3,094,694
STROBE PAINTING DISPLAY SYSTEM FOR RADAR INDICATOR
Filed March 12, 1959 4 Sheets-Sheet 1
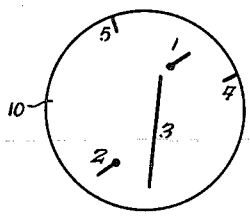
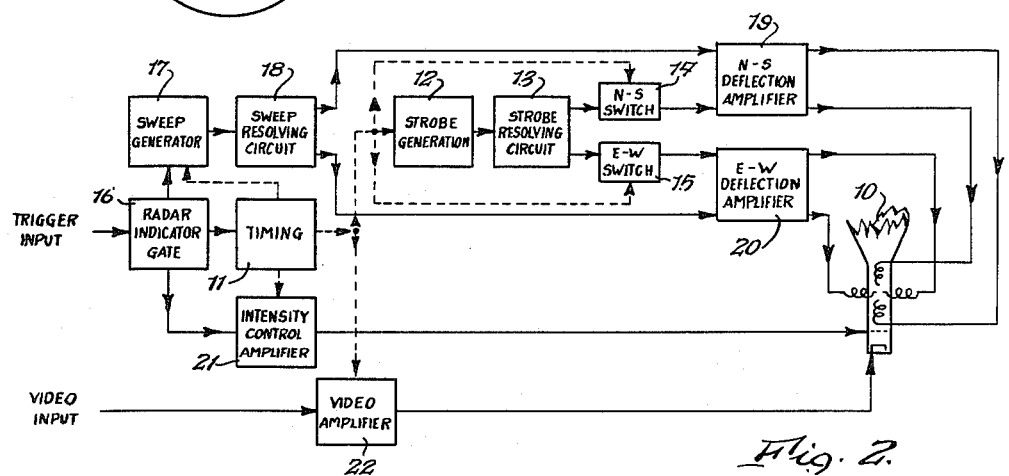
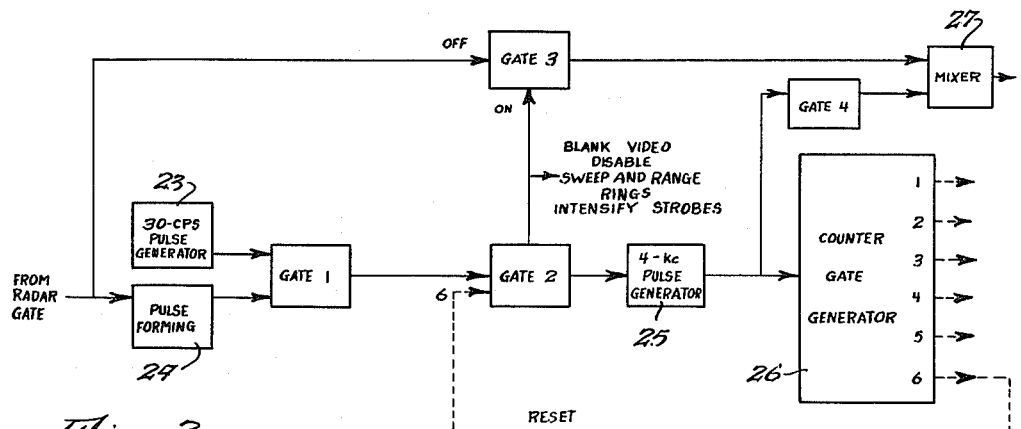
INVENTOR
John B. Beach
BY Popp and Sommer
ATTORNEY

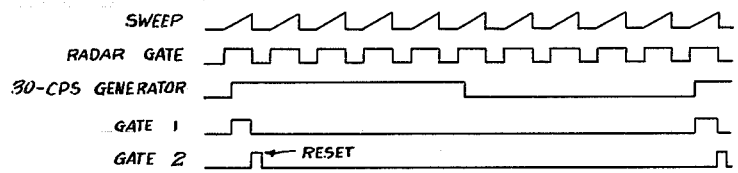
Fig. 4.
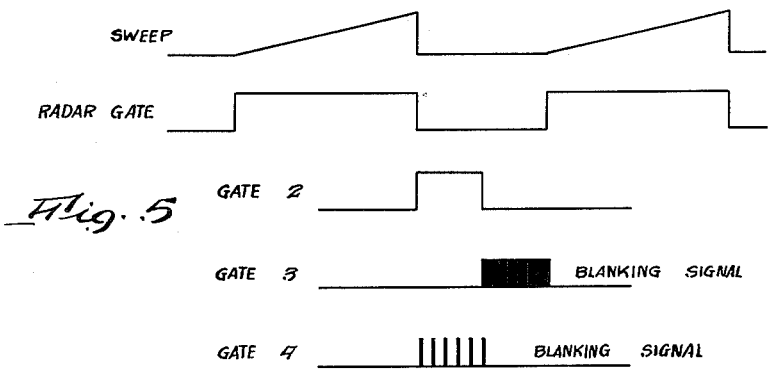
Fig. 5
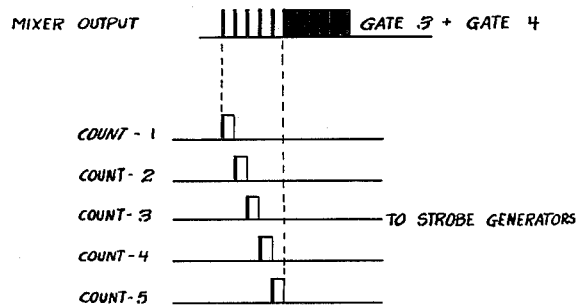
Fig. 6.
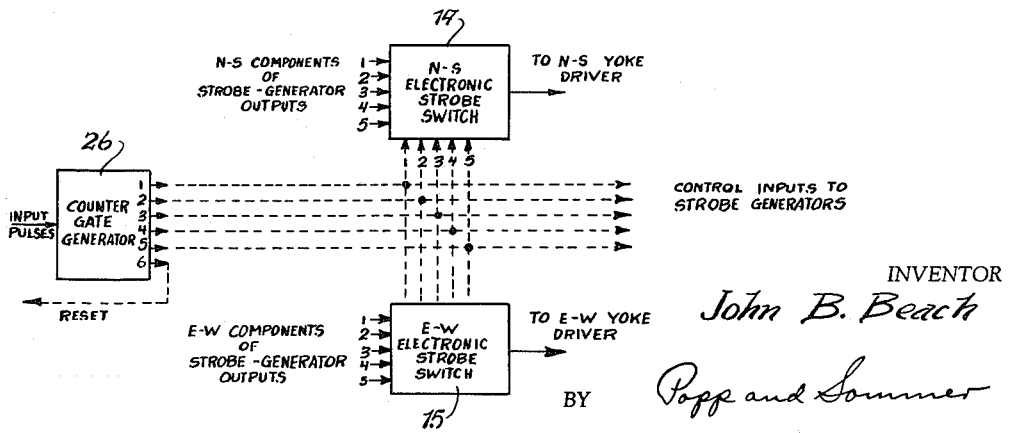
INVENTOR
John B. Beach
BY Popp and Sommer
ATTORNEY June 18, 1963  J. B. BEACH  3,094,694
STROBE PAINTING DISPLAY SYSTEM FOR RADAR INDICATOR
Filed March 12, 1959  4 Sheets-Sheet 3

INVENTOR
John B. Beach
BY Popp and Sommer
ATTORNEY

June 18, 1963  J. B. BEACH  3,094,694
STROBE PAINTING DISPLAY SYSTEM FOR RADAR INDICATOR
Filed March 12, 1959  4 Sheets-Sheet 4
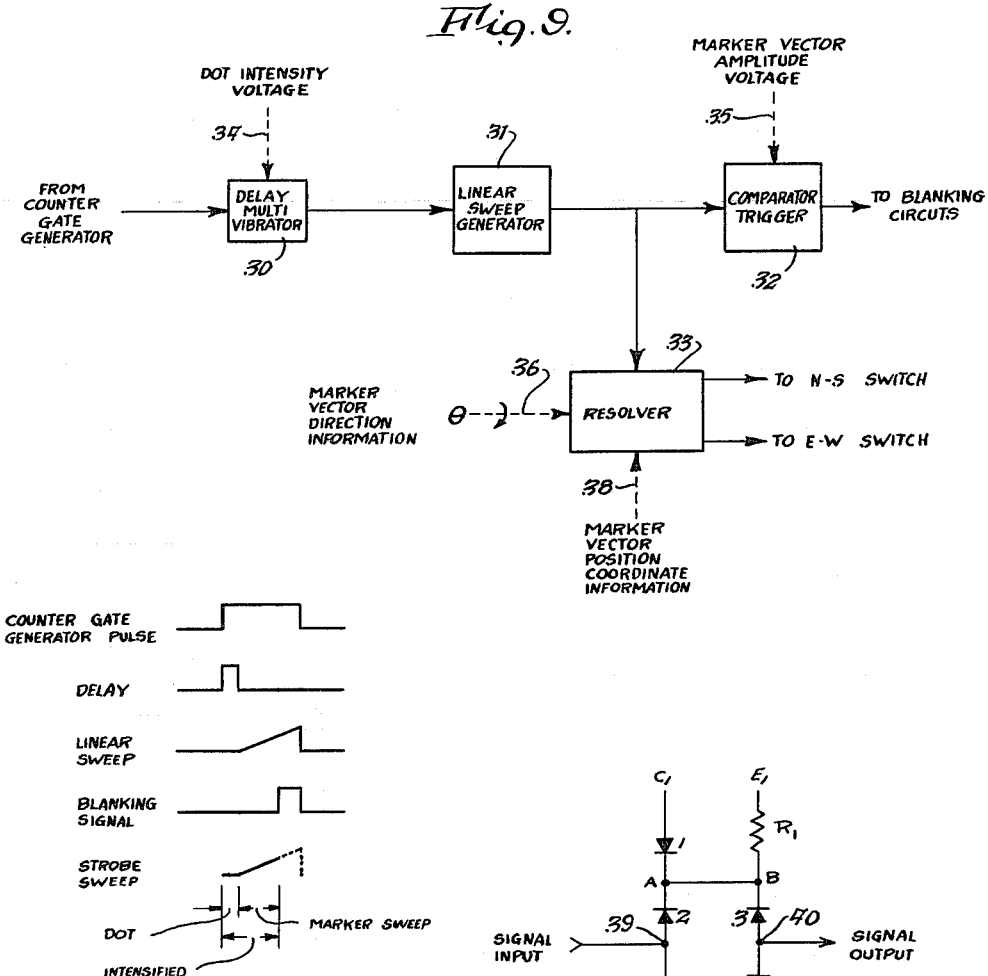
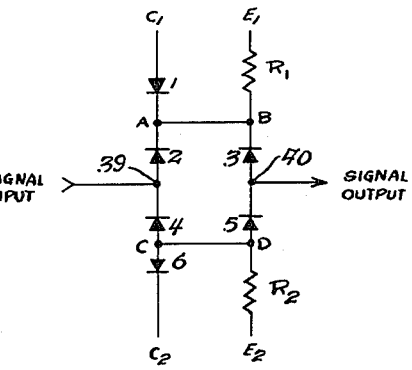
INVENTOR
John B. Beach
BY Popp and Sommer
ATTORNEY United States Patent Office 3,094,694
Patented June 18, 1963

3,094,694
STROBE PAINTING DISPLAY SYSTEM FOR RADAR INDICATOR
John B. Beach, East Amherst, N.Y., assignor to Cornell Aeronautical Laboratory, Inc., Buffalo, N.Y., a corporation of New York
Filed Mar. 12, 1959, Ser. No. 799,052
10 Claims. (Cl. 343—11)

This invention relates to a display system for presenting a plurality of electronic markers or strobes, representing tracking and vectoring information, on a radar plan position indicator (PPI). The information represented by the markers or strobes displayed can be used for any desired purpose such as by an observer in controlling interceptor groups against attacking aircraft.

As is well known by those skilled in the art, the electron beam of a PPI cathode ray tube is controlled by two yokes, or beam-deflection coils. Unless deflected the beam will terminate in a dot at the center of the PPI scope. Current through the N-S or E-W coils deflects the beam accordingly. When current is applied simultaneously to both coils, the beam is deflected along a line which is the vector sum or resultant of the two independent deflections. Thus, the simultaneous application of both N-S and E-W currents results in a two-dimensional presentation. If a time-varying current of appropriate magnitude is applied simultaneously to both the N-S and E-W coils, the radial trace of the beam can be made to occur at any desired azimuth. By cyclically modulating the two voltages in synchronism with the rotation of the radar antenna and controlling dot intensity by radar video, the PPI is caused to present the radar picture of blips.

The time-varying current applied to the deflection coils resembles a periodic saw-tooth function of a given period of time. During the first part of each cycle, the current increases to drive the beam outward from the center of the scope. This part of the cycle is called the sweep. When the beam reaches maximum deflection, it is turned off and the deflecting current falls to zero and remains there for a time before the next cycle begins. This part of the cycle is called dead time or retrace time.

It is during this interval of dead time or retrace time that the display system of the present invention uses the beam to paint markers or strobes which depict the information desired to be displayed.

The pulse repetition frequency of the radar is variable. Generally a high pulse repetition frequency is used for short range, and a low frequency for long range. Because the pulse repetition frequency or range scale of the indicator is variable, the sweep will consume varying fractions of the cycle time.

In accordance with one aspect of the present invention, if dead time is ever too short to accommodate the strobe-painting operation, the next sweep will be "borrowed" for painting the strobes. Since the time devoted to strobe-painting is only a small fraction of the total time available to the beam, however, the radar video presentation will suffer only slightly, even under the most extreme sweep-borrowing conditions.

Also in accordance with the same aspect of the present invention, strobe-painting begins only after a full sweep of the beam has been completed, that is, only after the sweep current has begun to fall to begin a new cycle.

It is possible to display several markers or strobes by presenting one during each dead time but the frequency of an individual marker in this case becomes equal to radar pulse repetition frequency divided by the number of markers presented. When this presentation frequency is below about 15 c.p.s. as it may be when operating at low pulse repetition frequencies and displaying several markers the marker or strobe will flicker which is bothersome and annoying to the person viewing the PPI scope.

Accordingly, it is an important object of the present invention to display during dead time not merely one but a plurality of markers or strobes in sequence as a burst and to repeat the display of such burst at a substantially constant frequency, above that which will appear as a flicker to the eye of the observer, although radar pulse repetition frequency may vary.

Another object is to provide such a display system which will delay painting the strobe burst at any time, if the burst wants to occur during a sweep, until dead time between sweeps.

Still another object is to provide such a display system which will suppress one or more radar sweeps subsequent to the beginning of painting a strobe burst, if such painting requires more time than normal dead time allows, such sweep suppression or borrowing occurring with high radar pulse repetition frequency.

A further object of the present invention is to provide a system for generating and displaying an electronic marker representing a vector on the PPI whereby vector magnitude and direction are represented respectively by marker length and orientation.

Still another object is to provide such a vector display system in which a dot may be produced at one end of the vector marker to represent position.

Other objects and advantages of the invention will be apparent from the following description and the accompanying drawings wherein FIG. 1 is a schematic of a display of five strobes painted on a PPI scope during dead time according to the principles of the present invention, each of such strobes representing different information.

FIG. 2 is a block diagram of the overall display system to provide time-sharing the scope beam for video presentation and strobe painting in accordance with the invention.

FIG. 3 is a block diagram of the system for generating voltages sequentially to control the operation of the strobe generators and switches shown in FIG. 2.

FIG. 4 is a comparative wave diagram illustrating a typical time relationship of the radar sweep, radar gate pulse, constant frequency pulse generator, and operative times of Gate 1 and Gate 2, all shown in FIG. 3.

FIG. 5 is a comparative wave diagram illustrating a typical time relationship of the radar sweep, radar gate pulse, the pulse of Gate 2, and the blanking signal outputs of Gate 3 and Gate 4 to the strobe generating gating voltages put out by the counter gate generator, all shown in FIG. 3.

FIG. 6 is a block diagram showing the relationship of the counter gate generator outputs to the strobe generators and switches shown in FIG. 2.

FIG. 9 is a block diagram of a typical strobe generating and resolving unit capable of producing a marker or strobe vector with a head or dot at one end, the head indicating position and the magnitude and direction of the vector being represented respectively by marker length and orientation.

FIG. 10 is a comparative wave diagram illustrating a typical time relationship of pulses produced by the unit shown in FIG. 9 to produce a strobe vector with a dot at one end.

FIG. 11 is a diagram of a bridge configuration of six silicon diodes providing an electronic switch, used as a component in the switches shown in FIG. 2.

Figure 7:
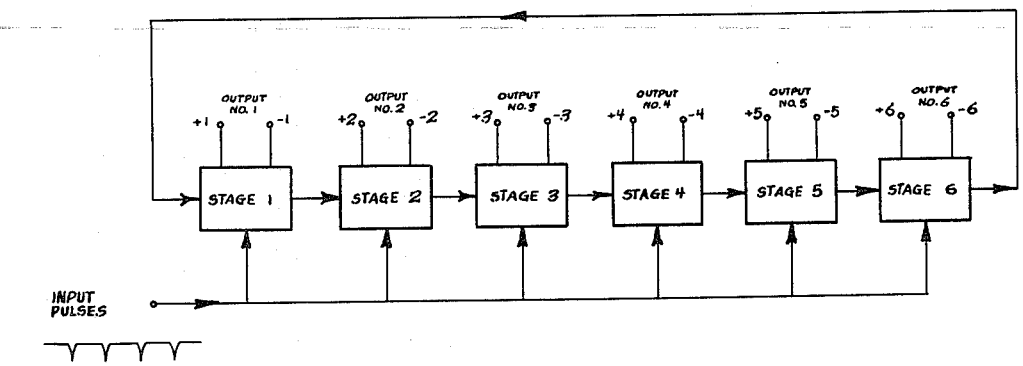
FIG. 7 is a block diagram of a 6-stage counter gate generator typifying the counter gate generator shown in FIGS. 3 and 6.

While any number N of strobes or markers may be displayed according to the present invention, depending upon the information desired to be displayed, five of the same, numbered 1, 2, 3, 4, 5, are illustrated on the viewing end of a PPI cathode ray tube 10 shown in FIG. 1. These strobes or markers are displayed sequentially as a strobe burst beginning during dead time. They may be employed to indicate information desired. Thus, for example, 1 may represent the target strobe, 2 the interceptor strobe, 3 the turn strobe, 4 the command heading marker, and 5 the closing heading marker, all useful to an air controller for directing an interceptor to a target.

Generation of the various strobes or markers is accomplished by time-sharing the electron beam of the PPI cathode ray tube and in a manner not to interfere unduly with the normal functions of the indicator. Therefore, these aids to the air controller are generated during the time that the radar indicator sweep is inactive. A system of high-speed timing and switching is required.

As shown in FIG. 2, the display system of the present invention operates in conjunction with the radar PPI cathode ray tube 10. The equipment of the system comprises a timing unit 11, a strobe generating unit including a strobe generation unit 12 and strobe resolving circuit 13, and a strobe switching unit including a N-S switch 14 and an E-W switch 15. These units, operating with the radar indicator gate 16 and an indicator sweep unit including a sweep generator 17 and sweep resolving circuit 18, time-share the indicator beam-deflection apparatus including a N-S deflection amplifier 19 and an E-W deflection amplifier 20, so that the aforementioned five strobes or markers are presented sequentially with minimum interruption of video.

Strobe presentation is synchronized with video presentation by a series of gating circuits. Fed by the radar indicator gate 16, the timing unit 11 generates timing pulses for the stroke generation unit 12 and strobe switching unit 14, 15. These same pulses must be fed to the sweep generator 17 of the indicator sweep unit and to an intensity control amplifier unit 21, as well as to a video amplifier unit 22, so that the functions of these units 21 and 22 are suppressed during strobe presentation.

The strobe generation unit 12 includes five strobe generating means each of which periodically generates a single linear sweep for one of the five strobes presented on the indicator. Gating voltages to activate these means sequentially are obtained from a counter gate generator, explained later herein, included in the timing unit 11. Outputs of the strobe generation unit 12 are connected through the resolving circuit 13 to the appropriate inputs of the switches 14, 15.

The strobe switches 14, 15 are electronic, each performing a switching operation by silicon diodes as explained later herein. Inputs to the electronic switches 14, 15 are the N-S and E-W components of the strobe position and strobe sweep voltages. Each of these switches has five input channels, corresponding to the five strobes, which are switched sequentially to the beam-deflection apparatus 19, 20. The switches 14, 15 are sequenced by timing pulses received from the aforementioned counter gate generator of the timing unit 11.

*Strobe Timing*

The strobes are preferably painted 30 times per second. This frequency is selected as a reasonable compromise between strobe flicker at lower radar pulse repetition frequencies and excessive "sweep borrowing" at higher frequencies.

The 30-c.p.s. strobe frequency is maintained by a 30-c.p.s. pulse generator, but is modified by the action of the radar gate indicator. Strobe presentation begins at the end of the first sweep following each 30-c.p.s. pulse. Five strobes are then sequentially switched to the display, at 250-microsecond intervals.

If the pulse repetition frequency and the range of the radar are such that dead time is insufficient for presenting the five strobes, the equipment suppresses the next radar sweep and continues to paint strobes. When the five strobes have been presented, the indicator is allowed to resume video presentation. In this way radar sweep time is used for strobe presentation only when dead time is insufficient. For most combinations of range and pulse repetition frequency, the radar sweep will not be interrupted for strobe presentation.

Provision must also be made for blanking certain other signals during the strobe painting operation. For example, if a sweep borrowing condition exists, the video must be blanked momentarily while the strobes are being painted. Similarly, at the end of strobe presentation, the indicator must be blanked until the next sweep begins. Even during strobe presentation the indicator must be blanked during the short intervals of time when the electronic switch is shifting from one strobe to another; otherwise one strobe would "smear" into the other. Thus, strobe timing must consider timing signals for blanking and intensifying the display as well as signals for generating strobe position and sweep voltages.

The timing unit 11 illustrated in FIG. 2 is shown in greater detail in FIG. 3. Referring to FIG. 3, the 30-c.p.s. pulse generator previously referred to is represented at 23, a pulse forming network at 24, a 4-kc. pulse generator at 25, a counter gate generator at 26, and a mixer at 27, all operatively associated with four gates, i.e. Gate 1, Gate 2, Gate 3, Gate 4, in a manner hereinafter explained.

Gate 1 is fed two signals, one from the 30 c.p.s. pulse generator 23 and one from the radar gate. These two signals respectively turn Gate 1 "on" and "off."

The signal from the radar gate is a square pulse having the same time duration as the sweep. This square pulse is put through the pulse-forming or differentiating network 24 which generates a negative "spike" or impulse at the end of the square pulse, that is, as the pulse falls to zero.

A pulse from the 30-c.p.s. generator 23 turns Gate 1 on. The first sweep-ending spike following the beginning of this pulse turns Gate 1 off and turns Gate 2 on. Thus the output of Gate 1 is a short pulse of varying time duration but of constant period. The leading edges of these short pulses will be uniformly spaced $\frac{1}{30}$ second apart, but the time-separation of the terminal edges of the pulses, which mark the turning on of Gate 2 will vary. The variation randomly falls within the time range of $\frac{1}{30}$ second to $\frac{1}{30}$ second plus the time represented by the reciprocal of the radar pulse repetition frequency.

Gate 2 is turned off by a re-set pulse fed back from the counter gate generator 26 at the end of the timing cycle, and will not be turned on again until another sweep-ending spike is passed through Gate 1. This event cannot occur until Gate 1 has first been turned on by a pulse from the 30-c.p.s. pulse generator 23.

A typical time relationship of the sweep, radar gate pulse, 30-c.p.s. generator pulse, and operative times of Gate 1 and Gate 2, are shown as a comparative wave diagram in FIG. 4.

Gate 2 controls the 4-kc. pulse generator 25. When Gate 2 is turned on, this generator starts generating 250-microsecond pulses and continues until Gate 2 is turned off at the end of the timing cycle.

The pulses from the 4-kc. pulse generator 25 are fed to the counter gate generator 26, which acts like a six-position stepping switch.

On the first five counts, the counter gate generator 26 provides gating voltages for the five strobe generators shown as the unit 12 in FIG. 2. The outputs of these generators are connected, through the electronic switches 14, 15, to the beam-deflection system 19, 20.

The sixth counter gate position is used to feed back a signal to turn off Gate 2. The disabling of Gate 2 shuts off the 4-kc. pulse generator 25, which remains off until the next 30-c.p.s. pulse again initiates the timing cycle.

The rest of the circuitry in the strobe-timing system, shown in FIG. 3, intensifies and blanks the PPI indicator as required.

Gate 2, in addition to controlling the 4-kc. pulse generator 25, supplies voltages to disable the sweep and range-ring generators (not shown), clamp the radar sweep generator (not shown), blank the video through the amplifier 22, and intensify the strobes during strobe presentation through the amplifier 21.

Gate 3, which depends upon both Gate 2 and the radar gate, supplies blanking signals to the PPI indicator. In response to a signal received from Gate 2, Gate 3 is turned on at the end of the strobe-painting operation and remains on until the next sweep begins. Thus, if any portion of a sweep has been borrowed for strobe painting, the whole sweep will be suppressed.

Gate 4 supplies a blanking signal during the time that the electronic switches 14, 15 are shifting from one strobe to the next. Thus one strobe is prevented from smearing into another.

A typical time relationship of the blanking signal outputs of Gate 3 and Gate 4 to the strobe generating gating voltages put out by the counter gate generator 26, and the pulses of Gate 2, radar gate and sweep, are shown as a comparative wave diagram in FIG. 5.

If desired, a time delay may be introduced following sweep ending in order to delay the closing of Gate 1 and simultaneous opening of Gate 2 and hence delay strobe presentation which occurs only while Gate 2 is open. The effect of such a time delay has not been illustrated.

Figure 8:
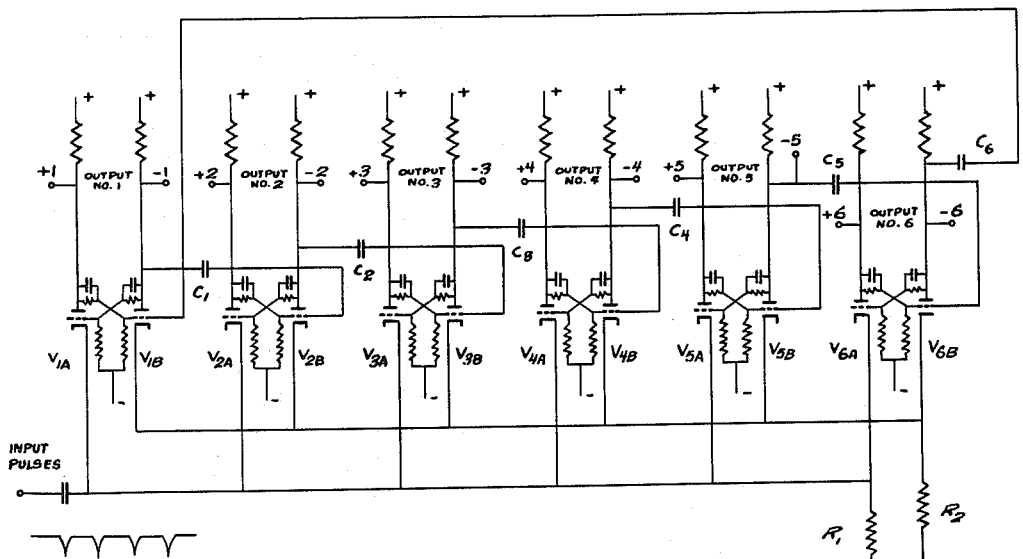
FIG. 8 is a simplified circuit diagram of the counter gate generator shown in FIG. 7.

A clearer understanding of the operation of the counter gate generator 26 that supplies gating signals for the electronic switches 14, 15 and strobe sweep generating units 12, 13 will be apparent from an examination of FIGS. 7 and 8. A block diagram of a 6-stage counter gate generator is shown in FIG. 7 and a simplified schematic diagram of the counter circuit is shown in FIG. 8.

Referring to FIG. 7, each of the blocks represents a bistable trigger with input pulses applied to all triggers simultaneously. In the system shown in FIG. 2, such input pulses come from the 4-kc. pulse generator 25.

Assume all triggers except stage 1 are in the condition that the input pulse tends to trigger them. The condition of stage 1 may be referred to as the "odd" condition and the condition of the other stages as the "normal" condition. An input pulse will now trigger stage 1 into the normal condition and the output of stage 1 will tend to trigger stage 2 into the odd condition. Stage 2 therefore has two opposing inputs; one from the input pulse which is common to all stages and another from stage 1. If circuit conditions are correct, the pulse stage 2 receives from stage 1 will override the common input pulse and stage 2 will trigger into the odd condition. The next pulse will trigger stage 3 into the odd condition. If pulses are continually supplied to the input, each stage will sequentially be in the odd condition and when stage 6 is reached this condition will transfer to stage 1. This characteristic of circulating on "odd" condition continuously through all the stages has resulted in the term ring counter being applied by those skilled in the art to this type of circuit.

Referring to FIG. 8, condensers $C_1$ to $C_6$ are used for interstage coupling. Tubes $V_{1A}$, $V_{2A}$, etc. are normally conducting and $V_{1B}$, $V_{2B}$, etc. are normally non-conducting. In order to insure that only one tube at a time will be in the "odd" condition, i.e., "A" tube cut off and "B" tube conducting, cathode resistor $R_1$ connected to normally conducting tubes is considerably lower in value than cathode resistor $R_2$ which is connected to the cathode of the normally non-conducting tubes.

By connecting the plates to a positive voltage and cathodes to a negative voltage, outputs which are symmetrical with relation to zero volts are obtained and these output gating voltages are applied to the electronic switches 14, 15 through cathode followers (not shown). The operation of these switches will be described later herein.

*Strobe Generation*

Each of the five strobe generators, represented collectively at 12 in FIG. 2, generates a single linear sweep once for the respective one of the five strobes presented. Gating voltages to operate these generators are obtained from the counter gate generator 26. On successive counts the gate is channeled to a different strobe generator. The outputs from the strobe generators are fed through resolvers, represented collectively at 13 in FIG. 2, to produce N-S and E-W components which are then fed to the respective strobe switches 14, 15, which in turn drive the beam-deflection system. These switches 14, 15 are also sequenced in the same order as the strobe generators by the gating voltage outputs of the counter 26.

The relationship of the gating control inputs to the strobe generators and switches 14, 15 is diagrammatically illustrated in FIG. 6 wherein it is also to be noted that the N-S and E-W components of the strobe generator outputs are put into these switches.

An important feature of the present invention is that a strobe or marker displayed on the PPI scope may indicate three types of information, i.e. position, direction and velocity. Thus, each of the target and interceptor strobes or markers 1 and 2 respectively, shown in FIG. 1 is a dot followed by a "tail." The position of the dot or head indicates the position of the target or interceptor. The direction of the tail indicates true heading, and the length of the tail indicates true air speed.

A typical strobe generating and resolving unit to present such a strobe vector is diagrammed in FIG. 9. This is illustrative of one of the systems included in the units 12 and 13 shown in FIG. 2. Referring to FIG. 9, a delay multivibrator is represented at 30, a linear sweep generator at 31, a comparator trigger at 32, and a resolver at 33. The operation of these units can perhaps best be understood by reference to the comparative wave diagram shown in FIG. 10.

A gating pulse of about 250-microsecond duration from the counter gate generator 26 is fed to the linear sweep generator 31 through the delay multivibrator 30. After a delay introduced by the multivibrator 30, the generator 31 produces a linear sweep. The head of the vector is represented by a dot (see FIG. 1) produced by holding the electron beam of the PPI fixed briefly on the spot indicating position. The beam is held by use of the delay multivibrator 30. Dot intensity is governed by delay time which is controlled by a dot intensity voltage input 34 to the multvibrator 30.

Comparator trigger 32 is fed two signals, one from the sweep generator 31 and the other 35 being a voltage representing marker vector amplitude. This voltage 35 is derived from the vectoring computer (not shown). Comparator trigger 32 generates a blanking pulse when marker vector amplitude 35 equals the sweep voltage from sweep generator 31. In this way the marker vector length, or tail, is made proportional to voltage 35. Thus, strobe length voltage from the vectoring computer determines the length of the strobe by intensifying the beam during the proper portion of the sweep and blanking the beam during the remaining portion.

The sweep voltage from generator 31 is resolved into N-S and E-W components by the resolver 33.

As is well known by those skilled in the art, coordinates can be transformed from one rectangular coordinate system to another rectangular coordinate system by means of a resolver.

A mechanical rotating type of resolver, for example, comprises a rotor and a stator, each having two perpendicular windings. The rotor and stator windings act respectively as the primary and secondary of a transformer. The coupling between primary and secondary varies sinusoidally with rotation of the rotor.

A field can be set up in the rotor by voltages applied to the two perpendicular rotor windings. The field is a space vector and takes the direction and magnitude of the vector sum of the two excitation voltages. This vector field induces voltages in the secondary (stator) winding. These voltages are components of the vector field which are parallel to the respective stator windings.

The resolver 33 can be either a mechanical rotating resolver of the type just briefly explained if vector direction is controlled by shaft rotation, as represented at 36 in FIG. 9, or it can be an electronic resolver if sin $\theta$ and cos $\theta$ coordinate voltages are available. In either case vector direction of the marker is derived from the vectoring computer (not shown).

Marker vector position coordinate information is also fed into the resolver 33 as represented at 38 in FIG. 9, one part of the information being the $x$ ordinate and the other the $y$ ordinate.

Thus, the sweep voltage is resolved into two components, a N-S component and an E-W component, which are fed to the respective electronic switches 14, 15 and thereby determine the direction of the marker appearing on the PPI scope.

Regarding the target marker or strobe 1, the target strobe generator is activated by count 1 from the counter gate generator 26. The length of the sweep is determined by target true air speed. The sweep voltage is resolved on target true heading and the outputs of the resolver are added to the target position coordinates. Thus the sweep originates at a point corresponding to target position, and the beam is deflected in the direction of target true heading by an amount determined by target true air speed.

In the case of the interceptor marker or strobe 2, the interceptor strobe generator is activated by count 2 from the counter gate generator 26. The length of the sweep is determined by the interceptor true air speed voltage received from the vectoring computer. The sweep voltage is fed to a resolver positioned to correspond to interceptor true heading. The outputs from the resolver are added to the interceptor position coordinates. Thus, the sweep originates at a point corresponding to interceptor present position, and the beam is deflected in the direction of interceptor true heading by an amount determined by interceptor true air speed.

*Strobe Switching*

As seen from above, the outputs from the various strobe-generating systems are fed to the N-S and E-W beam-deflection amplifiers 19 and 20, respectively, through the high-speed electronic switches 14, 15. Each switch 14, 15 preferably comprises an arrangement of silicon diodes.

In one polarity a silicon diode shows very low resistance and conducts current readily. The voltage drop across the diode is relatively small. In the other polarity the diode shows a very high resistance and conducts substantially no current.

A bridge configuration of six silicon diodes, as shown in FIG. 11, permits very high speed switching in response to the control voltages $C_1$ and $C_2$, when fixed voltages $E_1$ and $E_2$ are applied as shown. When $C_1$ and $E_1$ are negative and $C_2$ and $E_2$ are positive, any signal applied at the input terminal 39 is transmitted with negligible attenuation to the output terminal 40. When the polarity $C_1$ and $C_2$ are reversed, however, so that they have polarity opposite to that of $E_1$ and $E_2$, respectively, no signal is transmitted from input to output. Thus, the bridge acts like a switch.

When such a bridge is considered in the conducting configuration, diodes 2, 3, 4, and 5 conduct and their resistances in the conducting state are very small relative to the two equal resistances $R_1$ and $R_2$. Therefore, any voltage applied at the input will be realized with negligible attenuation at points A and C, and hence at points B and D. Therefore, the output voltage must be substantially the same as the input voltage.

Now consider such a bridge in the non-conducting state. Diodes 1 and 6 conduct; hence points C and D are substantially at a voltage $-V$ and points A and B are substantially at a voltage $+V$. Therefore, for all signal voltages between $+V$ and $-V$ the polarities across diodes 2, 3, 4 and 5 will not permit them to conduct. Accordingly, the output voltage remains substantially zero, regardless of fluctuations of the input voltage within these limits.

Each of the switches 14, 15 has such a bridge configuration of silicon diodes for each of the strobe generators. The input terminal of each bridge is connected to the respective strobe-generator output and the bridge output terminal is connected to the corresponding beam deflection amplifier 19 or 20. The control signals received from the counter gate generator 26 are connected severally to the ends $C_1$ and $C_2$ of the corresponding bridges.

Thus, the electronic switches 14, 15 used to connect the strobe generators to the beam-deflection system each have five input channels and one output channel, as shown in FIG. 6. The five inputs are connected to the output sequentially in response to the control signals received by the switches from the counter gate generator 26.

From the foregoing, it will be seen that the present invention provides a system of displaying sequentially on the PPI a plurality of strobes or markers representing tracking and vectoring information. The strobes or markers are steady and flickerless. By virtue of the time-sharing circuits of the display system, the beam of the display tube is employed for strobe painting principally during dead time and radar sweep is not interrupted enough to cause appreciable degradation of video information. Thus, the presentation of tracking and vectoring information does not interfere with the normal functions of the PPI.

What is claimed is:

1. In radar apparatus, the combination comprising a PPI cathode ray tube, means for deflecting the electron beam of said tube, and means utilizing the same beam deflection means for time-sharing said beam between radar sweep presentation and strobe presentation and arranged to begin strobe presentation during dead time between radar sweep presentation and recurring at a substantially constant frequency, said time-sharing means including timing means operatively arranged to generate sequentially N pulses, N strobe generating means severally activated by said pulses and switching means arranged to connect the outputs of said strobe generating means to said beam deflection means.

2. In radar apparatus, the combination comprising a plan position indicator, N strobe generating means each of which is adapted to present a strobe on said indicator, and timing means for activating sequentially said N strobe generating means, said timing means including means providing a normally closed first gate, means providing a normally closed second gate, means for feeding said first gate means a first pulse recurring at constant frequency to open said first gate, means for feeding said first gate means a second pulse in response to the first ending of a radar sweep following the beginning of said first pulse to close said first gate and to open said second gate, pulse generating means controlled by said second gate and means providing a counter gate generator arranged to count N plus one pulse outputs from said pulse generating means, such last pulse output being operative to close said second gate.

3. In radar apparatus, the combination comprising a plan position indicator, means providing a radar gate pulse in sychronism with radar sweep presentation, N strobe generating means each of which is adapted to present a strobe on said indicator, a timing means for activating sequentially said N strobe generating means, said timing means including a normally closed first gate, means providing a normally closed second gate, means for feeding said first gate means a first pulse recurring at constant frequency to open said first gate, means for forming a second pulse at the end of the first radar gate pulse following the beginning of said first pulse and feeding said second pulse to said first gate means to close said first gate and to open said second gate, pulse generating means controlled by said second gate and means providing a counter gate generator arranged to count N plus one pulse outputs from said pulse generating means, such last output being operative to close said second gate.

4. The combination as set forth in claim 3 in which said constant frequency is about 30 cycles per second and said pulse generating means generates a pulse having about a 4 kilocycle rate.

5. The combination as set forth in claim 3 which also includes means providing a third gate which controls the supply of a blanking signal to said indicator, said third gate being opened by said second gate at the conclusion of strobe presentation and closed by the beginning of the next radar gate pulse, whereby if any portion of a radar sweep is borrowed for strobe painting the whole sweep is suppressed.

6. The combination as set forth in claim 5 which also includes means providing a fourth gate which controls the supply of blanking signal pulses to said indicator in response to pulse outputs from said pulse generating means, said blanking signal pulses being of shorter duration than said pulse outputs, whereby one strobe is prevented from smearing into another.

7. In radar apparatus, the combination comprising a plan position indicator, and strobe generating means arranged to present a strobe vector on said indicator, said means including means for generating a linear sweep voltage, comparator trigger means to which said sweep voltage is fed and to which is also fed strobe vector amplitude voltage, said comparator trigger means generating a blanking pulse supplied to said indicator when said vector amplitude voltage equals the voltage of said sweep, and resolver means to which said sweep voltage is fed and to which is also fed strobe vector direction information, the output of said resolver means representing the direction of the strobe vector displayed on said indicator and the length of the strobe vector representing its magnitude and being controlled by the magnitude of said vector amplitude voltage.

8. In radar apparatus, the combination comprising a plan position indicator, and strobe generating means to present on said indicator a strobe vector having a head at one end, said means including multivibrator means activated by a control pulse and arranged to produce a delay time determined by the magnitude of a voltage input, means for generating a linear sweep voltage following the delay produced by said multivibrator means, comparator trigger means to which said sweep voltage is fed and to which is also fed strobe vector amplitude voltage, said comparator trigger means generating a blanking pulse supplied to said indicator when said vector amplitude voltage equals the voltage of said sweep, and resolver means to which said sweep voltage is fed and to which is also fed strobe vector direction information and to which is also fed strobe vector position coordinate information, the delay of strobe sweep producing said head at one end of the strobe vector displayed on said indicator and representing position and the output of said resolver means representing the direction of the strobe vector and the length of the strobe vector representing its magnitude and being controlled by the magnitude of said vector amplitude voltage.

9. In radar apparatus, the combination comprising a PPI cathode ray tube, means for deflecting the electron beam of said tube, and means for time-sharing said beam between radar sweep presentation and strobe presentation and arranged to begin strobe presentation during dead time between radar sweep presentation and recurring at a substantially constant frequency, said time-sharing means including timing means operatively arranged to generate sequentially N pulses, N strobe generating means severally activated by said pulses and switching means arranged to connect the outputs of said strobe generating means to said beam deflection means, at least one of said N strobe generating means being arranged to generate an electronic strobe representing a vector on said indicator and comprising means for generating a linear sweep voltage, comparator trigger means to which said sweep voltage is fed and to which is also fed strobe vector amplitude voltage, said comparator trigger means generating a blanking pulse supplied to said indicator when said vector amplitude voltage equals the voltage of said sweep, and resolver means to which said sweep voltage is fed and to which is also fed strobe vector direction information, the output of said resolver means representing the direction of the strobe vector displayed on said indicator and the length of the strobe vector representing its magnitude and being controlled by the magnitude of said vector amplitude voltage.

10. In radar apparatus, the combination comprising a PPI cathode ray tube, means for deflecting the electron beam of said tube, and means for time-sharing said beam between radar sweep presentation and stroke presentation and arranged to begin strobe presentation during dead time between radar sweep presentation and recurring at a substantially constant frequency, said time-sharing means including timing means operatively arranged to generate sequentially N pulses, N strobe generating means severally activated by said pulses and switching means arranged to connect the outputs of said stroke generating means to said beam deflection means, at least one of said N strobe generating means being arranged to generate an electronic strobe representing a vector on said indicator and comprising multivibrator means activated by one of said N pulses and arranged to produce a delay time determined by the magnitude of a voltage input, means for generating a linear sweep voltage following the delay produced by said multivibrator means, comparator trigger means to which said sweep voltage is fed and to which is also fed strobe vector amplitude voltage, said comparator trigger means generating a blanking pulse supplied to said indicator when said vector magnitude voltage equals that of the sweep voltage, and resolver means to which the sweep voltage is fed and to which is also fed strobe vector direction information and to which is also fed strobe vector position coordinate information, the delay of strobe sweep producing a dot at one end of the strobe vector displayed on said indicator and representing position and the output of said resolver means representing the direction of the strobe vector and the length of the strobe vector representing its magnitude and being controlled by the magnitude of said vector amplitude voltage.

References Cited in the file of this patent

UNITED STATES PATENTS

| | | |
|---|---|---|
| 2,715,335 | Hartman | Aug. 16, 1955 |
| 2,737,653 | Shreve | Mar. 6, 1956 |
| 2,866,191 | McFall | Dec. 23, 1958 |
| 2,950,475 | Hance | Aug. 23, 1960 |
| 2,991,466 | Byrnes et al. | July 4, 1961 |
| 3,001,192 | Hammond et al. | Sept. 19, 1961 |